(No Model.)

F. JONES.
APPARATUS FOR ELECTRICALLY TREATING LIQUIDS.

No. 592,735. Patented Oct. 26, 1897.

Witnesses:
W. J. Jaeker
E. A. Duggan

Inventor:
Fernando Jones.
By Chas. C. Tillman,
Atty

UNITED STATES PATENT OFFICE.

FERNANDO JONES, OF CHICAGO, ILLINOIS, ASSIGNOR OF ONE-HALF TO JOHN T. APPLEBERG, OF SAME PLACE.

APPARATUS FOR ELECTRICALLY TREATING LIQUIDS.

SPECIFICATION forming part of Letters Patent No. 592,735, dated October 26, 1897.

Application filed February 23, 1897. Serial No. 624,549. (No model.)

*To all whom it may concern:*

Be it known that I, FERNANDO JONES, a citizen of the United States, residing at Chicago, in the county of Cook and State of Illinois, have invented certain new and useful Improvements in an Apparatus for Electrically Treating Liquids, of which the following is a specification.

This invention relates to improvements in an apparatus for sterilizing, preserving, purifying, and otherwise improving the quality of liquids by electrical or electrolytic action, and while it is more especially designed and intended to be used for treating milk yet it is applicable and may be employed for treating other liquids; and it consists in certain peculiarities of the construction, novel arrangement, and operation of the various parts thereof, as will be hereinafter more fully set forth and specifically claimed.

The main objects of my invention are to provide an apparatus of simple and inexpensive construction and operation by means of which a quantity of liquid may be purified, sterilized, preserved, and otherwise beneficially treated by electrical or electrolytic action for the purpose of eliminating therefrom animal matter and organic impurities of all kinds or destroying bacteria and microbes in order to render it pure and wholesome for drinking and other purposes and to attain a more perfect or thorough and rapid action on the liquid or destruction of the deleterious matter or impurities therein by simultaneously subjecting its entire volume to a uniform current of electricity than has heretofore been accomplished. I attain these objects and results by the employment of the apparatus hereinafter described, and in order to enable others skilled in the art to which my invention pertains to make and use the same I will now proceed to describe it, referring to the accompanying drawings, in which—

Figure 1:
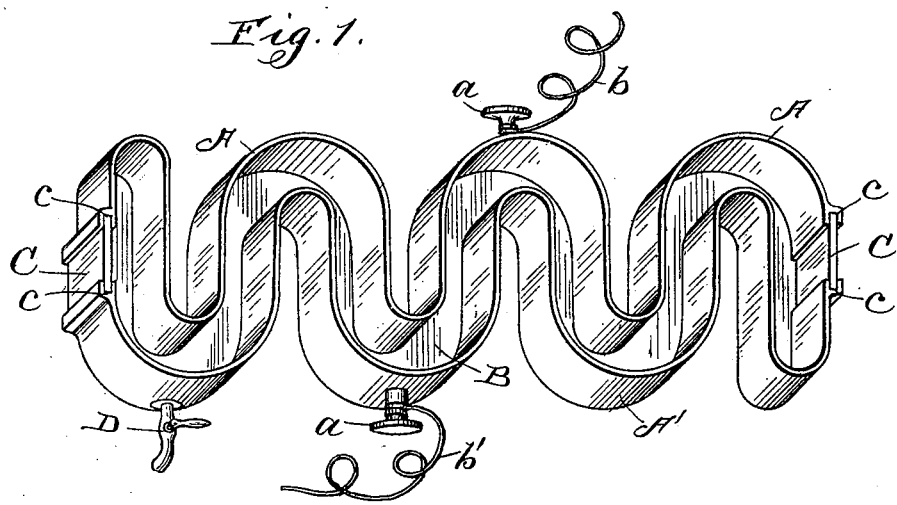
Figure 2:
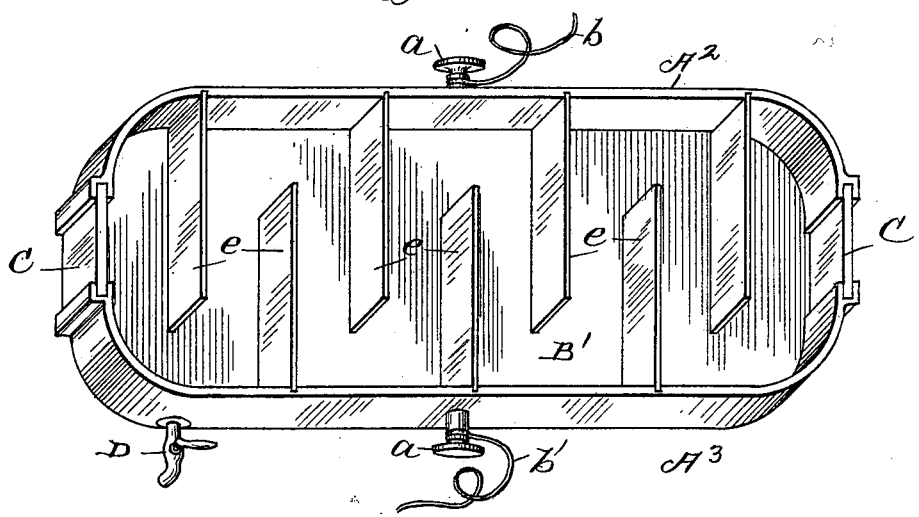

Figure 1 is a perspective view of my apparatus, and Fig. 2 is a similar view of a modified form thereof.

Similar letters refer to like parts throughout the different views of the drawings.

A and A' represent the sides of the vessel, vat, or tank, which may be made of any suitable dimensions, but preferably serpentine in shape, as shown in Fig. 1 of the drawings. The sides A and A' may be made of any suitable electric conducting material, but on account of its non-corrosive qualities preferably of aluminium, and are placed and secured at their lower edges on a bottom B, of non-conducting material—such as wood, porcelain, glass, gutta-percha, or the like—which bottom may also be seprentine in shape or may be rectangular or of any other desired form.

As shown in Fig. 1, the sides A and A' lie side by side and are everywhere separated by the same distance. In other words, they are formed of equidistant and serpentine curves and have secured between each of their ends a piece C of wood, porcelain, glass, or other non-electric conducting material. The ends of the side pieces A and A' are shown as having vertical grooves $c$ to receive the pieces C, but said pieces may be secured to the ends of the sides, so as to separate them in any suitable manner. Secured in the lower portion of one of the side pieces is a faucet D, of the ordinary or any preferred construction, to be used for drawing off the liquid after it shall have been treated. Connected to each of the side pieces at any suitable point is a binding-post $a$, to which are secured the current-conducting wires $b$ and $b'$, whose other ends may be connected to a battery or other source of electric supply.

By using a vessel of the above-described construction it is obvious that the volume of liquid held therein will be exposed to a greater side surface than if the vessel was made with straight sides, and as the sides A and A' are equidistant apart it is apparent that the electrolytic action on the volume of milk or other liquid will be simultaneous, efficient, and uniform throughout, the liquid itself being a sufficiently good electric conductor to cause the current to pass from one of the metallic side plates to the other, thus causing the current to be diffused and to permeate and act upon every particle of the liquid.

In Fig. 2 of the drawings I have shown a modification in the construction of my apparatus, which consists of two electric conducting side pieces $A^2$ and $A^3$, placed and secured on a non-electric conducting-bottom B' and having their ends separated, as in the firstnamed construction, by means of non-conducting pieces C. In this modification the side pieces are mainly parallel with one another, as shown, but are curved near their ends, so as to maintain as nearly as possible equal distances between the side pieces and partitions e, which are secured alternately on the inner surface of said side pieces, or may be made integral therewith, thus forming a part of the side pieces. These partitions are made of any suitable electric conducting material and may be attached to the side pieces in any desired manner. It will be observed that the distances from the free ends of the partitions to the side of the vessel adjacent to said free ends are the same as the distances from one partition to the other and that the distances between the curved portions of the sides are as nearly as possible the same as the distances between the partitions and the ends of the partitions and sides, and the sides are curved near their ends in order to form the compartments between the end partitions as nearly as possible of the same cubic capacity as the compartments between the partitions, so that the electrical or electrolytic action will be uniform and simultaneous on the entire volume of liquid contained in the vessel. The vessel now under consideration is likewise provided on each of its sides with a binding-post $a$ and electric conducting-wires $b$ and $b'$, connected at their other ends to a source of electric supply, as in the other construction, and the lower portion of one of the sides is provided with a faucet for drawing off the liquid.

Having thus fully described my invention, what I claim as new, and desire to secure by Letters Patent, is—

In an apparatus for electrically treating liquids, the combination with the equidistant sinusoidal electric conducting sides A, and A', of the non-electric conducting-bottom B, end pieces C, separating said sides, and an electric connection with each of the sides, substantially as described.

FERNANDO JONES.

Witnesses:
CHAS. C. TILLMAN,
E. A. DUGGAN.